US011396587B2

(12) United States Patent
Banaszak Holl et al.

(10) Patent No.: US 11,396,587 B2
(45) Date of Patent: *Jul. 26, 2022

(54) RECYCLING OF SUPERABSORBENT POLYMER VIA HYDROTHERMAL MICROWAVE PROCESSING

(71) Applicant: The Procter & Gamble Company, Cincinnati, OH (US)

(72) Inventors: Mark Monroe Banaszak Holl, South Varra (AU); Akshat Tanksale, Caulfield (AU); Teck Wei Ching, Wheelers Hill (AU); Jing Zhang, Clayton (AU); Dimitris Ioannis Collias, Mason, OH (US); John Andrew McDaniel, West Chester, OH (US); Gary Wayne Gilbertson, Liberty Township, OH (US); Martin Ian James, Hamilton, OH (US); Arsen Arsenov Simonyan, Schwalbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,139

(22) Filed: Aug. 21, 2020

(65) Prior Publication Data

US 2021/0054164 A1    Feb. 25, 2021

Related U.S. Application Data

(60) Provisional application No. 62/890,632, filed on Aug. 23, 2019.

(51) Int. Cl.
*C08J 11/16* (2006.01)
*C08J 7/12* (2006.01)

(52) U.S. Cl.
CPC ............ *C08J 11/16* (2013.01); *C08J 7/123* (2013.01); *C08J 2333/02* (2013.01)

(58) Field of Classification Search
USPC ................................. 521/40.5, 40
See application file for complete search history.

(56) References Cited

U.S. PATENT DOCUMENTS

| | | | |
|---|---|---|---|
| 5,244,934 A | 9/1993 | Umeda et al. | |
| 6,143,820 A | 11/2000 | Klier | |
| 8,383,746 B2 | 2/2013 | Torii | |
| 8,517,595 B2 | 8/2013 | Morrison, Jr. | |
| 9,095,853 B2 | 8/2015 | Somma | |
| 9,156,034 B2 | 10/2015 | Somma | |
| 9,822,203 B2 | 11/2017 | Haag | |
| 2009/0003123 A1 | 1/2009 | Morrison, Jr. et al. | |
| 2011/0210469 A1 | 9/2011 | Keller | |
| 2017/0095792 A1* | 4/2017 | Kim | C08F 20/10 |
| 2017/0166707 A1* | 6/2017 | Jang | C08K 3/20 |
| 2017/0198105 A1* | 7/2017 | Lee | C08J 3/24 |
| 2021/0053028 A1* | 2/2021 | Collias | B01J 20/3441 |
| 2021/0054163 A1* | 2/2021 | Collias | C08J 11/10 |

FOREIGN PATENT DOCUMENTS

| | | |
|---|---|---|
| JP | H09249711 A | 9/1997 |
| WO | 0035966 A1 | 6/2000 |

OTHER PUBLICATIONS

All Office Actions; U.S. Appl. No. 17/341,476, filed Jun. 8, 2021.
All Office Actions; U.S. Appl. No. 17/341,479, filed Jun. 8, 2021.
Unpublished U.S. Appl. No. 17/341,476, filed Jun. 8, 2021, to first inventor Dimitris Ioannis Collias.
Unpublished U.S. Appl. No. 17/341,479, filed Jun. 8, 2021, to first inventor Dimitris Ioannis Collias.
U.S. Appl. No. 16/999,127, filed Aug. 21, 2020, Dimitris Ioannis Collias et al.
U.S. Appl. No. 16/548,873, filed Aug. 23, 2019, Dimitris Ioannis Collias et al.
Extended European Search Report and Search Opinion; Application No. 20189522.4 dated Nov. 13, 2020; 6 pages.
All Office Actions, U.S. Appl. No. 16/548,873.
All Office Actions, U.S. Appl. No. 16/999,127.
Basedow et al., "Ultrasonic Degradation of Polymers in Solution", Advances in Polymer Science, vol. 22, 1977, pp. 83-148.
Caruso et al., "Mechanically-Induced Chemical Changes in Polymeric Materials", Chem. Rev. 2009, vol. 109, pp. 5755-5798.
Dubinsky et al., "Thermal Degradation of poly(acrylic acid) Containing Copper Nitrate", Polymer Degradation and Stability, vol. 86, 2004, pp. 171-178.
Ebrahim et al., "The Study of Ultrasonic Degradation of Superabsorbent Hydrogels", vol. 2012, Article ID 343768, 05 pages.
Gurkaynak et al., "High-Temperature Degradation of Polyacrylic Acid in Aqueous Solution", Journal of Polymer Science Part A: Polymer Chemistry, vol. 34, 1996, pp. 349-355.
Kaczmarek et al., "Photo-Oxidative Degradation of Some Water-Soluble Polymers in the Presence of Accelerating Agents", Die Angewandte Makromolekulare Chemie 261/262, 1998, pp. 109-121.
Le'pine et al., "Thermal Degradation of Polyacrylic Acid in Dilute Aqueous Solution", Polymer Degradation and Stability, vol. 75, 2002, pp. 337-345.
Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10, 2007, 7 pages.

(Continued)

*Primary Examiner* — Terressa Boykin
(74) *Attorney, Agent, or Firm* — James E Oehlenschlager (57) ABSTRACT

Poly(acrylic acid)-based superabsorbent polymer (SAP) and $H_2O_2$ in a feed is converted with microwave (MW) irradiation into poly(acrylic acid) (PAA) in the product. The MW total energy used to convert SAP into PAA is less than 50 MJ/kg SAP.

21 Claims, 2 Drawing Sheets

(56) References Cited

OTHER PUBLICATIONS

Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.

McGaugh et al., "The Thermal Degradation of Poly(Acrylic Acid)", Polymer Letters, vol. 5, 1967, pp. 817-820.

McNeill et al., "Thermal Stability and Degradation Mechanisms of Poly(Acrylic Acid and its Salts: Part 1—Poly(Acrylic Acid)", Polymer Degradation and Stability, 29 (1990), pp. 233-246.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.

Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.

Saita et al., "Degradation of Sodium-Polyacrylate in Dilute Aqueous Solution II", Japanese Journal of Applied Physics, vol. 22, No. 8, Aug. 1983, pp. 1310-1314.

Shukla et al, "Ultrasonic Degradation of Poly(acrylic acid)", Journal of Applied Polymer Science, vol. 112, 2009, pp. 991-997.

Shukla et al., "Oxidative and Photooxidative Degradation of Poly(acrylic acid)", Polymer Degradation and Stability, vol. 94, 2009, pp. 1238-1244.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

\* cited by examiner

RECYCLING OF SUPERABSORBENT POLYMER VIA HYDROTHERMAL MICROWAVE PROCESSING

FIELD OF THE INVENTION

The present invention generally relates to recycling of poly(acrylic acid)-based superabsorbent polymer (SAP) using microwave (MW) irradiation in hydrothermal conditions, at short residence times, and in the presence of hydrogen peroxide ($H_2O_2$). More specifically, a feed comprising SAP and a $H_2O_2$ solution is irradiated with microwaves at a temperature, and a product is produced, which comprises essentially poly(acrylic acid) (PAA). The concentration of SAP in the feed is greater than about 1 wt %, and the MW total energy used to convert SAP to PAA is less than about 50 MJ/kg SAP.

BACKGROUND OF THE INVENTION

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water. About 97% of SAP produced today is used in AHP applications, whereas the remainder about 3% is used in other applications, such as agricultural or horticultural water-retaining agents, and industrial waterproofing agents.

Recycling of AHPs involves cleaning of the AHPs from the soils accumulated during their use and separating the various components into recycled material streams. More specifically, the recycled SAP material stream can be used in applications less demanding than AHPs (since the recycled SAP has inferior properties compared to virgin SAP; for example, agricultural or horticultural water-retaining agents, and industrial waterproofing agents) and/or can be converted to essentially non-crosslinked and slightly branched or linear poly(acrylic acid) (PAA). Then, this PAA can be used as a feed material to various applications. For example, the PAA can be: 1) used as-is in applications such as water treatment or corrosion inhibition; or 2) esterified and then used in adhesives, coatings, etc.; or 3) re-polymerized and re-crosslinked back to SAP; or 4) blended with virgin SAP. The first two sets of applications are part of the effort to recycle SAP into other products by replacing virgin acrylic-acid-based compounds with compounds derived from recycled SAP, whereas the last two sets of applications are part of the circular economy of SAP, i.e., recycling SAP back to SAP. In all cases, the objective is to achieve the same properties as virgin materials.

Non-limiting examples of processes that produce purified and separated material streams of used SAP from recycled AHPs are disclosed and claimed in U.S. Pat. No. 9,095,853 B2, issued on Aug. 4, 2015; and U.S. Pat. No. 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Thermal (as well as photo and ultrasonic) degradation of SAP is described in: Shukla, N. B., and Madras, G., *J. Appl. Polym. Sci.*, 125 (2012), 630-639, and UV degradation of SAP is described in: Li, X., and Cui, Y., *J. Appl. Polym. Sci.*, 108 (2008), 3435-3441. Thermal degradation of PAA is described in many articles, such as: McGaugh, M. C., and Kottle, S., Polym. Letters, 5 (1967), 817-820; McNeill, I. C., and Sadeghi, S. M. T., *Polym. Degrad. Stability*, 29 (1990), 233-246; McNeill, I. C., and Sadeghi, S. M. T., *Polym. Degrad. Stability*, 30 (1990), 213-230; McNeill, I. C., and Sadeghi, S. M. T., *Polym. Degrad. Stability*, 30 (1990), 267-282; Gurkaynak, A., et al., *J. Polym. Sci. Part A: Polymer Chem*, 34 (1996), 349-355; Lépine, L., and Gilbert, R., *Polym. Degrad. Stability*, 75 (2002), 337-345; and Dubinsky, S., et al., *Polym. Degrad. Stability*, 86 (2004), 171-178. Other degradations of PAA, such as oxidative, photo-oxidative, ultrasonic, and solar irradiation, in the absence or presence of accelerating agents (such as free radical producing compounds—peroxides), are described in various studies, such as: Kaczmarek, H., et al., *Angew. Makromol. Chemie*, 262 (1998) 109-121; Shukla, N. B., et al., *Polym. Degrad. Stability*, 94 (2009), 1238-1244; and Prajapat, A. L., and Gogate, P. R., *Ultrason. Sonochem.*, 32 (2016), 290-299.

Based on the above references, thermal degradation introduces decarboxylation of the acrylic acid moeities, which renders them unusable. For example, McNeill and Sadeghi reported that the thermal degradation of PAA leads to water and $CO_2$ as major products, with minor products being monomer, dimer, and trimers recovered from cold ring residue. The mechanism shows free radical generation via backbone scission which produced dimers and trimers predominantly, and a minor quantity of monomer. The decarboxylation reaction produces $CO_2$ and thermal dehydration produces water vapor. Therefore, it is clear that production of free radicals and rapid propagation to depolymerize the polymer chain are essential for the selective depolymerization of PAA into smaller fractions of PAA or even acrylic acid (AA). In case of a shortage of these radicals and/or rapid quenching that does not give lifetimes appropriate for chain scission, the major product is $CO_2$ and water vapor. Gurkaynak et al. noted that decarboxylation to form a saturated hydrocarbon product was favored for high-temperature thermal degradation at low pH values. Subsequent work by Lépine and Gilbert provided evidence for main chain scission events. Reports by Madras et al. and Kaczmarek et al. indicated that oxidative and photo-oxidative strategies can help favor at least initiation of main chain scission.

Since the recovered SAP contains a high amount of moisture (many times the mass of dry SAP), the dewatering step to recover dry SAP can be quite energy intensive. Hydrothermal methods can, in principle, convert the challenge of high-water content into an operational advantage. Prajapat and Gogate showed that depolymerization of PAA can be done in liquid media with the help of additives, such as $H_2O_2$ and ozone, and the reaction can be accelerated using an ultrasound probe (they were able to achieve oligomers of weight-average molecular weight, $M_w$, down to 2.3 kDa (from a starting $M_w$ of 432 kDa)). $H_2O_2$ and ozone generated the free radicals and the energy for the reaction was provided by either ultrasound or solar heating.

Accordingly, there is a need to recycle AHPs and their major component, which is SAP. For the recycling of SAP there is a need to degrade SAP into poly(acrylic acid) (PAA), in short time scale; with low energy per unit mass of SAP; and at mild conditions that avoid decarboxylation of the degraded SAP. The requirement for low energy per unit mass of SAP stems from the fact that the recycling of SAP and its degradation to PAA is beneficial only if the energy spent during the converting of SAP to PAA is less than that used to make fossil-derived acrylic acid (petro-AA) from propylene, which is about 50 MJ/kg AA. The PAA produced from recycled SAP can then be incorporated back into virgin SAP (thus increasing its recycled content and supporting the circular economy of SAP) and/or derivatized into materials for other applications, such as, adhesives, coatings, water treatment, fabric care, etc.

SUMMARY OF THE INVENTION

In one embodiment of the present invention, a method for degrading a superabsorbent polymer (SAP) to poly(acrylic acid) (PAA) is presented. The method comprises placing a feed into a reactor, irradiating said feed with microwave (MW) at a temperature, and producing a product comprising said PAA at a carbon yield; wherein said feed comprises said SAP at a concentration greater than about 3 wt % and $H_2O_2$ at a concentration greater than about 0.5 wt % of said SAP concentration; wherein said feed has a residence time in said reactor between about 2 min and about 9 min; wherein said temperature is about 200° C.; wherein said carbon yield is greater than about 90%; and wherein said MW used to convert SAP to PAA requires a MW total energy of less than about 50 MJ/kg SAP.

In another embodiment of the present invention, a method for degrading a superabsorbent polymer (SAP) to poly(acrylic acid) (PAA) is presented. The method comprises placing a feed into a reactor, irradiating said feed with microwave (MW) at a temperature, and producing a product comprising said PAA at a carbon yield; wherein said feed comprises said SAP at a concentration of about 20 wt % and $H_2O_2$ at a concentration of about 0.1 wt %; wherein said feed has a residence time in said reactor of about 5 min; wherein said temperature is about 200° C.; wherein said carbon yield is about 98%; wherein said MW used to convert SAP to PAA requires a MW total energy of less than about 50 MJ/kg SAP; and wherein said PAA has a weight-average molecular weight less than about 1,000,000 g/mol.

BRIEF DESCRIPTION OF THE DRAWING

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I Definitions

As used herein, the term "SAP" refers to crosslinked, partially neutralized, and poly(acrylic acid)-based superabsorbent polymer. SAP examples are disclosed in U.S. Pat. Nos. 8,383,746 B2 and 9,822,203 B2. Typically, SAP is capable of absorbing a 0.9 wt % saline solution at 25° C. at least 10 times its dry weight. The typical absorption mechanism is osmotic pressure. SAP that absorbs water or aqueous solutions becomes a gel.

As used herein, the term "degree of neutralization" or "DN" refers to the mol percentage of the acid groups in SAP or PAA that are neutralized by the reaction with a base (typically, sodium hydroxide). A typical method to measure the DN of an SAP is to measure the Na content using the Inductively Coupled Plasma (ICP) analytical technique, as it is well known to those skilled in the art. If the amount of Na is wt % (Na), then the degree of neutralization is calculated as $DN=100\times72/((23\times100/wt\% (Na)-22))$.

As used herein, the term "poly(acrylic acid)" or "PAA" or "polymer of acrylic acid" refers to an essentially non-crosslinked, and either slightly branched or linear poly (acrylic acid) molecule with acrylic acid as the monomeric unit and degree of polymerization that can be 2 or higher. For the purposes of the present invention, there will be no difference between a polymer of acrylic acid and an oligomer of acrylic acid.

As used herein, the term "degradation" refers to the conversion of SAP into PAA via the actions of partial de-polymerization, de-crosslinking, molecular backbone breaking, or any combination of the above actions. For the purposes of the present invention, the terms degradation, recycling, and conversion are used interchangeably, as long as they refer to the transformation of SAP to PAA. Also, the degradation essentially preserves the carboxylic groups of the SAP and thus the product PAA contains those carboxylic groups. Note that full de-polymerization of SAP should lead to acrylic acid (AA).

As used herein, the term "virgin SAP" refers to SAP produced from virgin glacial acrylic acid, which is the feedstock used today to make SAP. Virgin glacial acrylic acid can be produced from either fossil-derived propylene or other bio-derived materials (non-limiting examples of bio-materials are: lactic acid, 3-hydroxypropionic acid, glycerin, bio-propylene, carbon dioxide, and sugar). Virgin SAP does not include any recycled SAP above about 1 wt %.

As used herein, the term "used SAP" refers to SAP which has already been produced industrially and/or used commercially, for example, in a baby diaper, feminine pad, adult incontinence pad, or other articles and/or uses. Used SAP can be post-consumer SAP, post-industrial SAP, or combinations of both. Unless otherwise noted in this invention, SAP refers to either "used SAP" or "virgin SAP".

As used herein, the term "degraded SAP" refers to SAP which has been degraded to PAA. For the purposes of the present invention, the terms "degraded SAP" and "PAA" are used interchangeably.

As used herein, the term "recycled SAP" refers to SAP which contains at least 1 wt % degraded SAP (or equivalently, PAA) that has been incorporated into the SAP while the SAP is being produced from glacial acrylic acid using the typical production method. Thus, the recycled SAP is a blend of virgin SAP and at least 1 wt % degraded SAP.

As used herein, the terms "viscosity ratio" or "viscosity reduction ratio" refer to the ratio of the viscosity of the product to that of the feed. The viscosity of the feed is typically measured with a parallel plate fixture in oscillatory mode, and the complex viscosity reported typically corresponds to a frequency of 1 rad/s. The viscosity of the product is measured with either a cup and bob fixture in steady mode or parallel plate fixture in oscillatory mode. When the viscosity is measured with a cup and bob fixture in steady mode the viscosity reported typically corresponds to a shear rate of 4 s$^{-1}$. These viscosity measurement techniques are well known to those skilled in the art. For the purposes of the present invention, the negative of the logarithm of the viscosity ratio indicates the extent of the SAP degradation to PAA in orders of magnitude, as it is accepted by those skilled in the art that the lower the viscosity of a PAA solution the lower the molecular weight of the PAA is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_w/M_n$.

II Feed

Unexpectedly, it has been found that microwave-based degradation of SAP to PAA, in the presence of free radical producing compounds (such as $H_2O_2$), achieves no or minimal decarboxylation at short residence times compared to thermal degradation. Without wishing to be bound by any theory, applicants believe that microwave heating, because of the rapid heating of polar molecules: 1) accelerates the free radical generation and thus the chemical scission reactions (e.g. breaking of the cross-linker, cross-linker attachments to the backbone, and backbone bonds), especially in the case that a free radical producing compound is present, and 2) offers far greater control of the reaction temperature, as well as directed energy input near the bonds of interest, as compared to thermal heating.

The typical properties of SAP are mechanical properties, swelling capacity, saline flow conductivity (SFC), absorption against pressure (AAP; INDA test method WSP 242.2), residual monomer, extractable polymer (amount of extractables), and centrifuge retention capacity (CRC). Also, for the purposes of the present invention, the SAP can include other co-monomers, such as itaconic acid, acrylamide, etc., or other materials, such as starch, cellulosic fibers, clays, etc.

SAP is typically prepared using a homogeneous solution polymerization process or by multi-phase polymerization techniques, such as inverse emulsion or suspension polymerization. The polymerization reaction is generally occurred in the presence of a relatively small amount of di- or poly-functional monomers, such as N,N'-methylene bisacrylamide, trimethylolpropane triacrylate, (poly) ethylene glycol di(meth)acrylate, triallylamine, etc. The di- or poly-functional monomer compounds serve to lightly crosslink the acrylate polymer chains, thereby rendering the SAP water-insoluble, yet water-swellable. Furthermore, SAP can be surface-crosslinked after polymerization by reaction with suitable crosslinking agents, such as di/poly-epoxides, di/poly-alcohols, di/poly-haloalkanes, etc. SAP is typically in particulate form, which in the case of solution polymerization is produced from a slab of material with any typical size reduction techniques, such as milling.

SAP can be fully un-neutralized (DN=0), fully neutralized (DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

In one embodiment of the present invention, the feed comprises SAP. In another embodiment of the present invention, the feed comprises SAP and water. In yet another embodiment of the present invention, the feed comprises SAP and ethylene glycol (EG). In even yet another embodiment of the present invention, the feed comprises SAP, water, and ethylene glycol. The water in the feed can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed or alternatively to enable higher SAP concentration to be used. A non-limiting example of a viscosity reducing salt is sodium sulfate.

The feed can also comprise any free radical producing chemical compound. Non-limiting examples of such chemical compounds are $H_2O_2$, persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc. In one embodiment of the present invention, the feed comprises SAP and $H_2O_2$. In another embodiment of the present invention, the feed comprises SAP, water, and $H_2O_2$.

In one embodiment of the present invention, the feed comprises SAP at a concentration greater than about 1 wt %. In another embodiment of the present invention, the feed comprises SAP at a concentration greater than about 3 wt %. In yet another embodiment of the present invention, the feed comprises SAP at a concentration greater than about 5 wt %. In even yet another embodiment of the present invention, the feed comprises SAP at a concentration greater than about 10 wt %. In one embodiment of the present invention, the feed comprises SAP at a concentration greater than about 20 wt %. In another embodiment of the present invention, the feed comprises SAP at a concentration of about 2.5 wt %. In yet another embodiment of the present invention, the feed comprises SAP at a concentration of about 4.8 wt %. In even yet another embodiment of the present invention, the feed comprises SAP at a concentration of about 10 wt %. In one embodiment of the present invention, the feed comprises SAP at a concentration of about 20 wt %.

In one embodiment of the present invention, the feed comprises SAP and $H_2O_2$, and the concentration of $H_2O_2$ is greater than about 0.25 wt % of the SAP concentration. In another embodiment of the present invention, the feed comprises SAP and $H_2O_2$, and the concentration of $H_2O_2$ is greater than about 0.5 wt % of the SAP concentration. In yet another embodiment of the present invention, the feed comprises SAP and $H_2O_2$, and the concentration of $H_2O_2$ is greater than about 0.75 wt % of the SAP concentration. In even yet another embodiment of the present invention, the feed comprises SAP and $H_2O_2$, and the concentration of $H_2O_2$ is greater than about 1 wt % of the SAP concentration. In one embodiment of the present invention, the feed comprises SAP and $H_2O_2$, and the concentration of $H_2O_2$ is about 0.5 wt % of the SAP concentration.

In one embodiment of the present invention, the feed comprises SAP and $H_2O_2$, and the concentration of $H_2O_2$ is greater than about 0.05 wt %. In another embodiment of the present invention, the feed comprises SAP and $H_2O_2$, and the concentration of $H_2O_2$ is greater than about 0.1 wt %. In yet another embodiment of the present invention, the feed comprises SAP and $H_2O_2$, and the concentration of $H_2O_2$ is greater than about 0.15 wt %. In even yet another embodiment of the present invention, the feed comprises SAP and $H_2O_2$, and the concentration of $H_2O_2$ is greater than about 0.5 wt %. In one embodiment of the present invention, the feed comprises SAP and $H_2O_2$, and the concentration of $H_2O_2$ is about 0.1 wt %.

The viscosity of the feed is typically measured with a parallel plate fixture in oscillatory mode, and the complex viscosity reported typically corresponds to a frequency of 1 rad/s. Depending on the SAP concentration the complex viscosity of the feed can be higher than 200 Pa·s (or equivalently, 200,000 cP).

The non-renewable energy use (NREU) to make acrylic acid (AA) from the fossil-derived propylene is estimated to be about 50 MJ/kg SAP (equivalently, 50 MJ/kg AA). Therefore, any successful recycling attempt of SAP needs to expend less energy than the NREU to make AA, i.e., less than 50 MJ/kg SAP. For the purposes of the NREU, it is assumed that the SAP is fully non-neutralized (DN=0).

III MW Irradiation

The MW irradiation, in the presence of $H_2O_2$, degrades SAP into PAA. The MW irradiation can take place in any suitable reactor as known to those skilled in the art. The feed is placed inside the reactor and gets irradiated by MW (i.e., gets exposed to the MW irradiation) for a period of time, called the residence time in the reactor.

In one embodiment of the present invention, the residence time of the feed in the reactor is less than about 60 min. In another embodiment of the present invention, the residence time of the feed in the reactor is less than about 20 min. In yet another embodiment of the present invention, the residence time of the feed in the reactor is less than about 10 min. In even yet another embodiment of the present invention, the residence time of the feed in the reactor is less than about 5 min.

In one embodiment of the present invention, the residence time of the feed in the reactor is between about 2 min and about 9 min. In another embodiment of the present invention, the residence time of the feed in the reactor is between about 4 min and about 6 min. In yet another embodiment of the present invention, the residence time of the feed in the reactor is about 5 min.

The MW total energy is the electric energy that is supplied to the MW unit and is based on the voltage and amperage of the unit, and the residence time of the feed. The MW irradiation energy (or simply, MW energy) is the MW energy dissipated in the feed and used to convert SAP to PAA.

In one embodiment of the present invention, the MW irradiation energy used to convert SAP to PAA is less than about 4 MJ/kg SAP. In another embodiment of the present invention, the MW irradiation energy used to convert SAP to PAA is less than 3 MJ/kg SAP. In yet another embodiment of the present invention, the MW irradiation energy used to convert SAP to PAA is less than 1.5 MJ/kg SAP. In even yet another embodiment of the present invention, the MW irradiation energy used to convert SAP to PAA is less than 1 MJ/kg SAP. In one embodiment of the present invention, the MW irradiation energy used to convert SAP to PAA is less than 0.5 MJ/kg SAP.

In one embodiment of the present invention, the MW total energy used to convert SAP to PAA is less than about 50 MJ/kg SAP. In another embodiment of the present invention, the MW total energy used to convert SAP to PAA is less than about 36 MJ/kg SAP. In yet another embodiment of the present invention, the MW total energy used to convert SAP to PAA is less than about 18 MJ/kg SAP. In even yet another embodiment of the present invention, the MW total energy used to convert SAP to PAA is less than about 12 MJ/kg SAP. In one embodiment of the present invention, the MW total energy used to convert SAP to PAA is less than about 6 MJ/kg SAP.

The MW irradiation in the reactor takes place at a temperature. In one embodiment of the present invention, the temperature of the MW irradiation in the reactor is less than about 300° C. In another embodiment of the present invention, the temperature of the MW irradiation is less than about 250° C. In yet another embodiment of the present invention, the temperature of the MW irradiation in the reactor is less than about 200° C. In even yet another embodiment of the present invention, the temperature of the MW irradiation in the reactor is less than about 150° C.

In one embodiment of the present invention, the temperature of the MW irradiation in the reactor is about 250° C. In another embodiment of the present invention, the temperature of the MW irradiation in the reactor is about 200° C. In yet another embodiment of the present invention, the temperature of the MW irradiation in the reactor is about 175° C. In even yet another embodiment of the present invention, the temperature of the MW irradiation in the reactor is about 150° C.

Also, the MW irradiation can take place at atmospheric pressure, in vacuum, or at elevated pressure. Furthermore, the MW irradiation can be preceded or followed by other processes, such as UV irradiation, IR heating, ultrasonic/cavitation, extrusion, extensional stretching, etc.

IV Product

The MW irradiation of the feed produces a product. In one embodiment of the present invention, the product comprises PAA. In another embodiment of the present invention, the product comprises PAA and SAP.

In one embodiment of the present invention, the PAA has a weight-average molecular weight less than about 1,000,000 g/mol. In another embodiment of the present invention, the PAA has a weight-average molecular weight less than about 750,000 g/mol. In yet another embodiment of the present invention, the PAA has a weight-average molecular weight less than about 500,000 g/mol. In even yet another embodiment of the present invention, the PAA has a weight-average molecular weight less than about 300,000 g/mol. In one embodiment of the present invention, the PAA has a weight-average molecular weight less than about 200,000 g/mol. In another embodiment of the present invention, the PAA has a weight-average molecular weight less than about 100,000 g/mol. In yet another embodiment of the present invention, the PAA has a weight-average molecular weight less than about 30,000 g/mol.

In one embodiment of the present invention, the PAA has a weight-average molecular weight between about 1,000,000 g/mol and about 500,000 g/mol. In another embodiment of the present invention, the PAA has a weight-average molecular weight between about 500,000 g/mol and about 200,000 g/mol. In yet another embodiment of the present invention, the PAA has a weight-average molecular weight between about 200,000 g/mol and about 100,000 g/mol. In even yet another embodiment of the present invention, the PAA has a weight-average molecular weight between about 100,000 g/mol and about 30,000 g/mol.

In one embodiment of the present invention, the PAA has a polydispersity index (PDI) less than about 10. In another embodiment of the present invention, the PAA has a PDI less than about 6. In yet another embodiment of the present invention, the PAA has a PDI less than about 4. In even yet another embodiment of the present invention, the PAA has a PDI less than about 2.

In one embodiment of the present invention, the PAA has a PDI between about 10 and about 2. In another embodiment of the present invention, the PAA has a PDI between about 6 and about 2. In yet another embodiment of the present invention, the PAA has a PDI between about 4.5 and about 3. In even yet another embodiment of the present invention, the PAA has a PDI between about 4 and about 3. In one embodiment of the present invention, the PAA has a PDI of about 4.2. PDI is the ratio of the weight-average molecular weight to the number-average molecular weight, and these molecular weights are measured by GPC (described in the Methods section VII) as it is known to those skilled in the art.

In one embodiment of the present invention, the carbon yield of the PAA in the product is greater than about 95%. In another embodiment of the present invention, the carbon yield of the PAA in the product is greater than about 90%. In yet another embodiment of the present invention, the carbon yield of the PAA in the product is greater than about 80%. In even yet another embodiment of the present invention, the carbon yield of the PAA in the product is greater than about 70%. In one embodiment of the present invention, the carbon yield of the PAA in the product is about 98%.

The viscosity of the product is typically measured with a cup and bob fixture in steady mode, and the steady viscosity reported typically corresponds to a shear rate of 4 $s^{-1}$. Depending on the PAA concentration and molecular weight, the viscosity of the product can be as low as 1 mPa·s (or equivalently, 1 cP; i.e., the viscosity of water).

The ratio of the viscosity of the product to that of the feed is the viscosity reduction ratio (or simply, viscosity ratio), and it indicates the extent of the SAP degradation to PAA by the MW system. The negative logarithm of the viscosity ratio measures the orders of magnitude change between the viscosity of the feed and the product. In one embodiment of the present invention, the negative logarithm of the viscosity ratio is less than about 6. In another embodiment of the present invention, the negative logarithm of the viscosity ratio is less than about 4. In yet another embodiment of the present invention, the negative logarithm of the viscosity ratio is less than about 2.

PAA from the product can be derivatized into materials for various applications, such as, adhesives, coatings, water treatment, etc. In one embodiment of the present invention, PAA from the product, either as is or derivatized, is used as an adhesive. In yet another embodiment of the present invention, PAA from the product, either as is or derivatized, is used in fabric care applications. In even yet another embodiment of the present invention, PAA from the product, either as is or derivatized, is used in water treatment applications.

In one embodiment of the present invention, PAA from the product is used as a ply glue in paper products. In another embodiment of the present invention, PAA from the product is used as a ply glue in paper towel products. In yet another embodiment of the present invention, PAA from the product is used as a ply glue in toilet paper products. In even yet another embodiment of the present invention, PAA from the product is used as ply glue in paper products has $M_w$ greater than about 350 kDa. In one embodiment of the present invention, PAA from the product is used as ply glue in paper products has $M_w$ between about 400 kDa and about 500 kDa.

In another embodiment of the present invention, PAA from the product is used as a glue between the paper core and paper towel products. In even another embodiment of the present invention, PAA from the product is used as a glue between the paper core and toilet paper products.

PAA can be extracted from the product via a number of processes. Non-limiting examples of these processes are water evaporation, PAA filtration, water extraction, etc. Also, salts present in the product from the use of SAP in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

V Recycled SAP

PAA from the product can be fed into the process to make SAP from glacial acrylic acid, thus producing recycled SAP. In one embodiment of the present invention, the PAA is used to produce a recycled SAP.

In one embodiment of the present invention, the SAP comprises PAA at a concentration, and wherein the PAA concentration is less than about 60 wt %. In another embodiment of the present invention, the SAP comprises PAA at a concentration, and wherein the PAA concentration is less than about 50 wt %. In yet another embodiment of the present invention, the SAP comprises PAA at a concentration, and wherein the PAA concentration is less than about 45 wt %. In even yet another embodiment of the present invention, the SAP comprises PAA at a concentration, and wherein the PAA concentration is less than about 40 wt %. In one embodiment of the present invention, the SAP comprises PAA at a concentration, and wherein the PAA concentration is less than about 30 wt %. In another embodiment of the present invention, the SAP comprises PAA at a concentration, and wherein the PAA concentration is less than about 20 wt %. In yet another embodiment of the present invention, the SAP comprises PAA at a concentration, and wherein the PAA concentration is less than about 15 wt %. In even yet another embodiment of the present invention, the SAP comprises PAA at a concentration, and wherein the PAA concentration is less than about 10 wt %.

In one embodiment of the present invention, the recycled SAP has an amount of extractables, and wherein the amount of extractables is less than about 20 wt %. In another embodiment of the present invention, the recycled SAP has an amount of extractables, and wherein the amount of extractables is less than about 15 wt %. In yet another embodiment of the present invention, the recycled SAP has an amount of extractables, and wherein the amount of extractables is less than about 10 wt %. In even yet another embodiment of the present invention, the recycled SAP has an amount of extractables, and wherein the amount of extractables is less than about 7 wt %.

In one embodiment of the present invention, the recycled SAP has a swelling ratio, and wherein the swelling ratio is greater than about 50 g/g. In another embodiment of the present invention, the recycled SAP has a swelling ratio, and wherein the swelling ratio is greater than about 45 g/g. In yet another embodiment of the present invention, the recycled SAP has a swelling ratio, and wherein the swelling ratio is greater than about 40 g/g. In even yet another embodiment of the present invention, the recycled SAP has a swelling ratio, and wherein the swelling ratio is greater than about 35 g/g.

In one embodiment of the present invention, the recycled SAP has a swelling ratio, and wherein the swelling ratio is about 50 g/g. In another embodiment of the present invention, the recycled SAP has a swelling ratio, and wherein the swelling ratio is about 45 g/g. In yet another embodiment of the present invention, the recycled SAP has a swelling ratio, and wherein the swelling ratio is about 42 g/g. In even yet another embodiment of the present invention, the recycled SAP has a swelling ratio, and wherein the swelling ratio is about 40 g/g.

In one embodiment of the present invention, the recycled SAP has a CRC, and wherein the CRC is between about 20 g/g and about 45 g/g. In another embodiment of the present invention, the recycled SAP has a CRC, and wherein the CRC is between about 25 g/g and about 40 g/g. In yet another embodiment of the present invention, the recycled SAP has a CRC, and wherein the CRC is between about 30 g/g and about 35 g/g.

In one embodiment of the present invention, the recycled SAP has an AAP, and wherein said AAP is between about 15 g/g and about 40 g/g. In another embodiment of the present invention, the recycled SAP has an AAP, and wherein said AAP is between about 20 g/g and about 35 g/g. In yet another embodiment of the present invention, the recycled SAP has an AAP, and wherein said AAP is between about 25 g/g and about 30 g/g.

VI Examples

The SAP used in the Examples below is denoted as SAP "STC 18166", came from the Procter & Gamble Co. (Cincinnati, Ohio) and its properties are shown in the Methods section VII.

Figure 1:
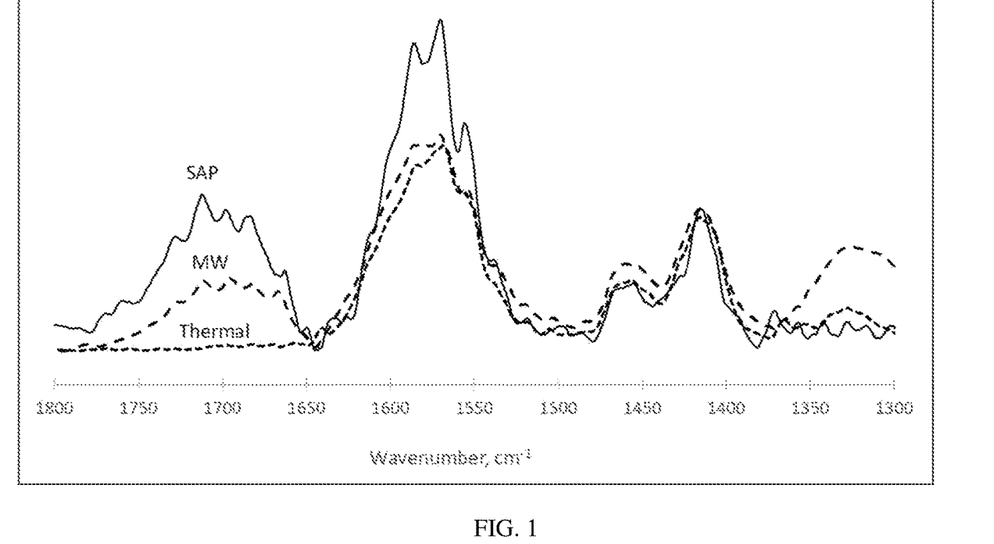
FIG. 1 is a graph showing IR spectra of 1) virgin SAP; 2) SAP treated with microwave; and 3) SAP treated in an autoclave by thermal heating. The IR spectra were normalized using the 1414 $cm^{-1}$ band, corresponding to the in-plane C—O—H bend. The reaction conditions were: feed with 2.4 wt % SAP, temperature was 200° C., and residence time was 20 min.

Inventive EXAMPLE 2 shows that microwave heating causes much less decarboxylation than thermal heating (in an autoclave; comparative EXAMPLE 1). The results from EXAMPLES 1 and 2 are shown in FIG. 1.

Example 1—Comparative

A feed with 2.4 wt % SAP and 97.6 wt % MilliQ water was subjected to thermal heating in an autoclave at 200° C. for 20 min. The product was analyzed using PTIR (Photothermal Infrared Spectroscopy) to assess the level of decarboxylation. The IR spectra were normalized using the 1414 cm$^{-1}$ band (corresponding to the in-plane C—O—H bend). Less than 3% of the product maintained its carboxylic (C=O) functionality, i.e., the product was at least 97% decarboxylated, as measured by the 1710/1580 cm$^{-1}$ band ratio.

Example 2

The feed of EXAMPLE 1 was subjected to microwave heating at 200° C. for 20 min (i.e., same conditions as in EXAMPLE 1). The product was analyzed using PTIR to assess the level of decarboxylation. The IR spectra were normalized using the 1414 cm$^{-1}$ band (corresponding to the in-plane C—O—H bend). About 72% of the product maintained its carboxylic (C=O) functionality, i.e., the product was about 38% decarboxylated, as measured by the 1710/1580 cm$^{-1}$ band ratio.

Figure 2:
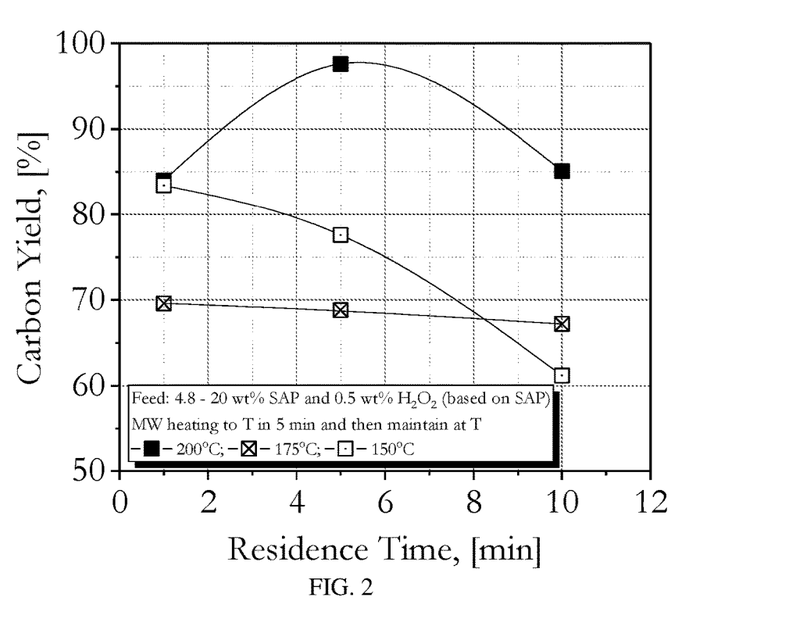
FIG. 2 is a graph showing the carbon yield as a function of the residence time of the feed in the microwave field. The curves are for feeds with 4.8-20 wt % SAP and 0.5 wt % $H_2O_2$ (based on the SAP).
Figure 3:
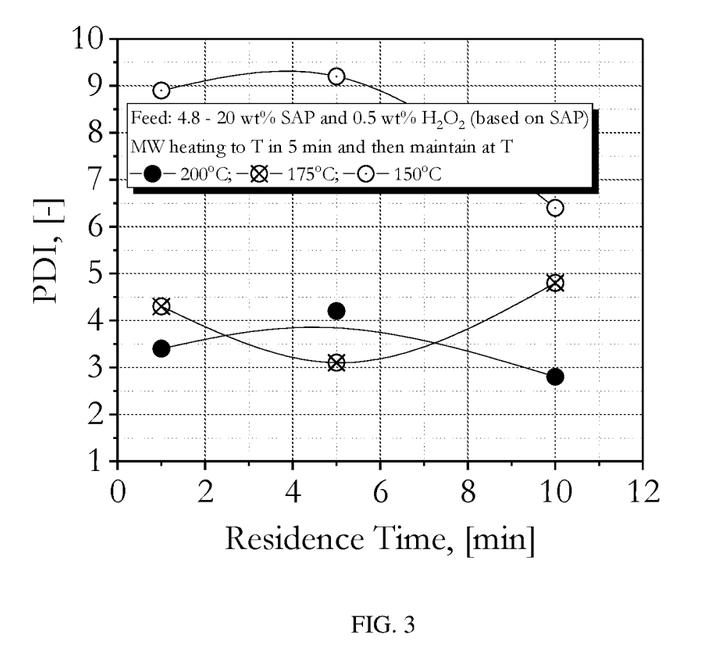
FIG. 3 is a graph showing the PDI as a function of the residence time of the feed in the microwave field. The curves are for feeds with 4.8-20 wt % SAP and 0.5 wt % $H_2O_2$ (based on the SAP).

Inventive EXAMPLE 11 shows that the carbon yield, that correlates to the degree of decarboxylation, is the highest at 200° C. and 5 min residence time. The results from this inventive EXAMPLE 11 and comparative EXAMPLES 3-10 are also shown in Table 1 and FIGS. 2 and 3.

Example 3—Comparative 0.48 g of SAP, 9.5176 mL of MilliQ water, and 0.0024 g of $H_2O_2$ were placed in a 100 mL PTFE reaction vessel (Questron Technologies Corp.; Ontario, Canada) to produce a feed (in gel form) with 4.8 wt % SAP, 0.024 wt % $H_2O_2$, and 95.176 wt % MilliQ water. Before the reaction vessel was sealed tight and the MW heating started, the reaction vessel was subjected to 10 cycles of vacuum (80 kPa) and nitrogen purging to eliminate oxygen in the headspace. The tightly-sealed reaction vessel was then transferred into a Qlab Pro Microwave Digestion System (Questron Technologies Corp.; Ontario, Canada). The reaction was performed using the temperature control mode, in which the maximum power of 500 W was used for ramping up the temperature from room temperature to 150° C. in 5 min. Then, the microwave power was adjusted automatically to maintain the temperature for another 1 min. After that period of time, the product in the reaction vessel was allowed to cool to less than 80° C. before it was removed from the Qlab Pro Microwave Digestion System. The product $M_n$, $M_w$, and PDI were measured as 43.2 kDa, 384 kDa, and 8.9, respectively, and the yield was measured as 83.4%.

Example 4—Comparative

The feed and process of EXAMPLE 3 were followed and the only exception was that the reaction was performed using the temperature control mode, in which the maximum power of 500 W was used for ramping up the temperature from room temperature to 175° C. in 5 min, and then the microwave power was adjusted automatically to maintain the temperature for another 5 min. The product $M_n$, $M_w$, and PDI were measured as 5.2 kDa, 16.4 kDa, and 3.1, respectively, and the yield was measured as 68.8%.

Example 5—Comparative

The feed and process of EXAMPLE 3 was followed and the only exception was that the reaction was performed using the temperature control mode, in which the maximum power of 500 W was used for ramping up the temperature from room temperature to 200° C. in 5 min, and then the microwave power was adjusted automatically to maintain the temperature for another 10 min. The product $M_n$, $M_w$, and PDI were measured as 2.1 kDa, 5.8 kDa, and 2.8, respectively, and the yield was measured as 85.1%.

Example 6—Comparative 1 g of SAP, 8.995 mL of MilliQ water, and 0.005 g of $H_2O_2$ were placed in a 100 mL PTFE reaction vessel (Questron Technologies Corp.; Ontario, Canada) to produce a feed (in gel form) with 10 wt % SAP, 0.05 wt % $H_2O_2$, and 89.95 wt % MilliQ water. Before the reaction vessel was sealed tight and the MW heating started, the reaction vessel was subjected to 10 cycles of vacuum (80 kPa) and nitrogen purging to eliminate oxygen in the headspace. The tightly-sealed reaction vessel was then transferred into a Qlab Pro Microwave Digestion System (Questron Technologies Corp.; Ontario, Canada). The reaction was performed using the temperature control mode, in which the maximum power of 500 W was used for ramping up the temperature from room temperature to 150° C. in 5 min. Then, the microwave power was adjusted automatically to maintain the temperature for another 5 min. After that period of time, the product in the reaction vessel was allowed to cool to less than 80° C. before it was removed from the Qlab Pro Microwave Digestion System. The product $M_n$, $M_w$, and PDI were measured as 18.7 kDa, 171.6 kDa, and 9.2, respectively, and the yield was measured as 77.6%.

Example 7—Comparative

The feed and process of EXAMPLE 6 were followed and the only exception was that the reaction was performed using the temperature control mode, in which the maximum power of 500 W was used for ramping up the temperature from room temperature to 175° C. in 5 min, and then the microwave power was adjusted automatically to maintain the temperature for another 10 min. The product $M_n$, $M_w$, and PDI were measured as 5 kDa, 24.1 kDa, and 4.8, respectively, and the yield was measured as 67.2%.

Example 8—Comparative

The feed and process of EXAMPLE 6 were followed and the only exception was that the reaction was performed using the temperature control mode, in which the maximum power of 500 W was used for ramping up the temperature from room temperature to 200° C. in 5 min, and then the microwave power was adjusted automatically to maintain the temperature for another 1 min. The product $M_n$, $M_w$, and PDI were measured as 3.2 kDa, 11.1 kDa, and 3.4, respectively, and the yield was measured as 84%.

Example 9—Comparative 2 g of SAP, 7.99 mL of MilliQ water, and 0.01 g of $H_2O_2$ were placed in a 100 mL PTFE reaction vessel (Questron Technologies Corp.; Ontario, Canada) to produce a feed (in gel form) with 20 wt % SAP, 0.1 wt % $H_2O_2$, and 79.9 wt % MilliQ water. Before the reaction vessel was sealed tight and the MW heating started, the reaction vessel was subjected to 10 cycles of vacuum (80 kPa) and nitrogen purging to eliminate oxygen in the headspace. The tightly-sealed reaction vessel was then transferred into a Qlab Pro Microwave Digestion System (Questron Technologies Corp.; Ontario, Canada). The reaction was performed using the temperature control mode, in which the maximum power of 500 W was used for ramping up the temperature from room temperature to 150° C. in 5 min. Then, the microwave power was adjusted automatically to maintain the temperature for another 10 min. After that period of time, the product in the reaction vessel was allowed to cool to less than 80° C. before it was removed from the Qlab Pro Microwave Digestion System. The product $M_n$, $M_w$, and PDI were measured as 18.4 kDa, 118.7 kDa, and 6.4, respectively, and the yield was measured as 61.2%.

Example 10—Comparative

The feed and process of EXAMPLE 9 were followed and the only exception was that the reaction was performed using the temperature control mode, in which the maximum power of 500 W was used for ramping up the temperature from room temperature to 175° C. in 5 min, and then the microwave power was adjusted automatically to maintain the temperature for another 1 min. The product $M_n$, $M_w$, and PDI were measured as 21.5 kDa, 93.1 kDa, and 4.3, respectively, and the yield was measured as 69.6%.

Example 11

The feed and process of EXAMPLE 8 were followed and the only exception was that the reaction was performed using the temperature control mode, in which the maximum power of 500 W was used for ramping up the temperature from room temperature to 200° C. in 5 min, and then the microwave power was adjusted automatically to maintain the temperature for another 5 min. The product $M_n$, $M_w$, and PDI were measured as 5.4 kDa, 23 kDa, and 4.2, respectively, and the yield was measured as 97.6%.

The compositions of the feed, experimental conditions, and results from comparative EXAMPLES 3 to 10 and inventive EXAMPLE 11 are summarized in Table 1 below.

TABLE 1

| EXAMPLE # | SAP, [wt %] | Temperature, [° C.] | Time, [min] | $M_n$, [kDa] | $M_w$, [kDa] | PDI, [—] | Carbon Yield, [%] |
|---|---|---|---|---|---|---|---|
| 3 | 4.8 | 150 | 1 | 43.2 | 384.0 | 8.9 | 83.4 |
| 4 | 4.8 | 175 | 5 | 5.2 | 16.4 | 3.1 | 68.8 |
| 5 | 4.8 | 200 | 10 | 2.1 | 5.8 | 2.8 | 85.1 |
| 6 | 10 | 150 | 5 | 18.7 | 172.6 | 9.2 | 77.6 |
| 7 | 10 | 175 | 10 | 5.0 | 24.1 | 4.8 | 67.2 |
| 8 | 10 | 200 | 1 | 3.2 | 11.1 | 3.4 | 84 |
| 9 | 20 | 150 | 10 | 18.4 | 118.7 | 6.4 | 61.2 |
| 10 | 20 | 175 | 1 | 21.5 | 93.1 | 4.3 | 69.6 |
| 11 | 20 | 200 | 5 | 5.4 | 23.0 | 4.2 | 97.6 |

VII Methods

Molecular Weight Distribution (MWD) Analysis

The number-average molecular weight ($M_n$), weight-average molecular weight ($M_w$), and polydispersity index (PDI) were measured as follows. The product material was diluted to 0.05 wt % using MilliQ water and filtered using a 0.45 μm syringe filter before analyzing it in an Agilent 1220 Infinity HPLC, equipped with a 300×7.8 mm Phenomenex Poly Sep-GFC-P4000 column. Diode Array Detector (DAD—196, 220, 254, 285 nm) and Refractive Index Detector (RID) were used to quantify fragments of product at different molecular weights. The analysis was carried out using 0.1 M $NaNO_3$ and 0.1 M $NaHCO_3$ in water as eluent, flow rate of 0.8 mL/min, injection volume of 10 μL, column oven temperature at 35° C., and RID temperature of 35° C. Calibration of the column at these conditions was performed using the Agilent Polyacrylic Acid (Na salt) Calibration Kit (1,000-1,000,000 Da). Only molecular weight ranges between 3,000 and 400,000 were considered for the calibration curve as this is the limit of the PolySep-GFC-P4000 column.

Carbon Yield Measurement

The yield of product PAA was calculated via a carbon balance using a Shimadzu TOC-L Total Organic Carbon (TOC) Analyzer (Shimadzu Corp.; Kyoto, Japan). The carbon balance was performed on the basis that carbon comprises 50 wt % of the mass of acrylic acid. Any loss of yield indicates decarboxylation. Yield less than 100% indicate decarboxylation and thus loss of carbon in gaseous products.

Decarboxylation Determination

A determination of whether the product was decarboxylated was done using Photothermal Infrared Spectroscopy (PTIR; mIRage IR microscope; Anasys Instruments Corp; Santa Barbara, Calif.). A drop of the product was placed on a standard 3 in.×1 in. microscope slide and the sample was allowed to dry at 60° C. under vacuum for 12 h. IR spectra were generated by measuring the thermal expansion of the sample using a visible green laser probe as a function of the IR laser wavelength. The IR spectra were normalized using the 1414 $cm^{-1}$ band (corresponding to the in-plane C—O—H bend), and the degree of decarboxylation was measured by the 1710/1580 $cm^{-1}$ band ratio.

SAP "STC 18166" Properties

The SAP "STC 18166" material was analyzed for capacity, moisture, and extractable polymer using the Centrifuge Retention Capacity (CRC) test method (EDANA method WSP 241.2.R3), moisture test method (EDANA method WSP 230.2.R3), and extractable polymer test method (EDANA method WSP 270.2.R3), respectively. The results were as follows: CRC=27.2 g/g; Moisture=0.2 wt %; and Extractable Polymer=6.9 wt %.

MW Total Energy Calculations

The MW total energy is the electric energy that is supplied to the MW unit and is based on the voltage and amperage of the unit, and the residence time of the feed. The MW total energy per unit mass of SAP is then calculated from the MW total energy and the amount of SAP that is in the feed.

MW Irradiation Energy Calculations

The MW irradiation energy (or simply, MW energy) is the MW energy dissipated in the feed and used to convert SAP to PAA.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading a superabsorbent polymer (SAP) to poly(acrylic acid) (PAA) comprising placing a feed into a reactor, irradiating said feed with microwave (MW) at a temperature, and producing a product comprising said PAA at a carbon yield; wherein said feed comprises said SAP at a concentration greater than about 3 wt % and hydrogen peroxide ($H_2O_2$) at a concentration greater than about 0.5 wt % of said SAP concentration; wherein said feed has a residence time in said reactor between about 2 min and about 9 min; wherein said temperature is about 200° C.; wherein said carbon yield is greater than about 90%; and wherein said MW used to convert SAP to PAA requires a MW total energy of less than about 50 MJ/kg SAP.

2. The method of claim 1, wherein said residence time is between about 4 min and about 6 min.

3. The method of claim 1, wherein said residence time is about 5 min.

4. The method of claim 1, wherein said SAP concentration is greater than about 5 wt %.

5. The method of claim 1, wherein said SAP concentration is greater than about 10 wt %.

6. The method of claim 1, wherein said MW total energy is less than about 12 MJ/kg SAP.

7. The method of claim 1, wherein said MW total energy is less than about 6 MJ/kg SAP.

8. The method of claim 1, wherein said SAP has degree of neutralization (DN) greater than about 50%.

9. The method of claim 1, wherein said SAP has DN between about 65% and about 75%.

10. The method of claim 1, wherein said carbon yield is greater than 95%.

11. The method of claim 1, wherein said carbon yield is about 98%.

12. The method of claim 1, wherein said PAA has a weight-average molecular weight less than about 1,000,000 g/mol.

13. The method of claim 1, wherein said PAA has a weight-average molecular weight less than about 500,000 g/mol.

14. The method of claim 1, wherein said PAA has a weight-average molecular weight less than about 200,000 g/mol.

15. The method of claim 1, wherein said PAA has a polydispersity index (PDI) between about 4.5 and about 3.

16. The method of claim 1, wherein said PAA has a PDI between about 4 and about 3.

17. The method of claim 1, wherein said PAA has a PDI of about 4.2.

18. A method for degrading a superabsorbent polymer (SAP) to poly(acrylic acid) (PAA) comprising placing a feed into a reactor, irradiating said feed with microwave (MW) at a temperature, and producing a product comprising said PAA at a carbon yield; wherein said feed comprises said SAP at a concentration of about 20 wt % and $H_2O_2$ at a concentration of about 0.1 wt %; wherein said feed has a residence time in said reactor of about 5 min; wherein said temperature is about 200° C.; wherein said carbon yield is about 98%; wherein said MW used to convert SAP to PAA requires a MW total energy of less than about 50 MJ/kg SAP; and wherein said PAA has a weight-average molecular weight less than about 1,000,000 g/mol.

19. The method of claim 18, wherein said SAP has DN between about 65% and about 75%.

20. The method of claim 18, wherein said PAA has a PDI of about 4.2.

21. The method of claim 18, wherein said weight-average molecular weight of said PAA is less than about 500,000 g/mol.

* * * * *